United States Patent Office 2,993,913
Patented July 25, 1961

2,993,913
PREPARATION OF 2,2-BIS(HYDROXYMETHYL) TETRAHYDROFURAN
Andrew P. Dunlop, Riverside, Ill., assignor to The Quaker Oats Company, Chicago, Ill., a corporation of New Jersey
No Drawing. Filed Jan. 7, 1959, Ser. No. 785,337
3 Claims. (Cl. 260—347.8)

This invention relates to new and novel organic compounds and more particularly to 2,2-bis(hydroxymethyl) tetrahydrofuran, derivatives thereof, and to processes for the preparation of these new compositions of matter.

The novel compound 2,2-bis(hydroxymethyl)tetrahydrofuran which has the chemical structure indicated below:

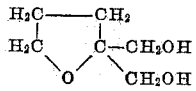

can be prepared by reacting formaldehyde with tetrahydrofurfural in the presence of an alkaline condensing agent. The substantially pure compound may be obtained by this process using either crude or refined tetrahydrofurfural as the starting material.

In a more specific embodiment of this invention tetrahydrofurfural is slowly added to a mixture consisting of aqueous or aqueous-alcoholic formaldehyde and an alkaline condensing agent, the mixture being maintained at a low temperature, i.e. within the range of about 10° C. to about 60° C. during this addition. After a relatively short reaction period, depending on the temperature employed and the yield desired, the product is recovered from the reaction mixture by conventional methods known to those skilled in the art, for example, by fractional distillation and/or crystallization. If necessary external cooling is used to keep the temperature from exceeding the aforesaid range in order to minimize side reactions which might impair completion of the desired reaction.

As the alkaline condensing agent, in the above specific embodiment, sodium hydroxide is satisfactory, preferably in an amount providing a molar ratio of sodium hydroxide to tetrahydrofurfural of at least about 1:1. Other agents which are effective include lime, barium hydroxide, potassium hydroxide, other alkali metal and alkaline earth metal hydroxides, and basic ion-exchange resins, the amount employed preferably being sufficiently to provide at least about one equivalent weight of alkaline agent per mole of tetrahydrofurfural.

The amount of formaldehyde employed in the aforesaid specific embodiment is preferably not less than about 2 moles per mole of the tetrahydrofurfural. The aqueous solution of formaldehyde is preferably one containing about 5% to about 40% by weight of formaldehyde. Prior to recovering the desired product from the reaction mixture the following procedure is preferably employed: (1) the reaction mixture is neutralized with an acid such as formic acid; (2) the neutralized mixture is concentrated, for example, by distillation; (3) the concentrate thus obtained is diluted with an alcohol such as isobutanol, butanol or any saturated lower-aliphatic alcohol; and (4) the resulting solid phase and liquid phase are separated. The desired product is then preferably recovered from the liquid phase by fractional distillation.

In an alternative embodiment of the invention, the 2,2-bis(hydroxymethyl)tetrahydrofuran is prepared employing the aforedescribed reagents but with the following exceptions: (1) the molar ratio of formaldehyde to tetrahydrofurfural is preferably at least about 1:1, (2) the alkaline condensing agent need only be present in catalytic amounts, and (3) the resulting reaction product is reduced by catalytic hydrogenation prior to isolation of the desired product by fractional distillation, crystallization or other conventional methods well known to those skilled in the art.

The aforedescribed hydrogenation is preferably carried out at a temperature of less than 125° C. and at superatmospheric pressure. Any catalysts suitable for hydrogenation may be employed such as nickel catalysts, e.g. Raney nickel or nickel on kieselguhr; copper-containing catalysts, e.g. reduced copper oxide or copper chromate; or noble metal catalysts. The hydrogenation is preferably carried out until hydrogen has been consumed to the extent of at least about one mole of hydrogen per mole of tetrahydrofurfural employed.

The following examples are illustrative of the preparation of 2,2-bis(hydroxymethyl)tetrahydrofuran but are not to be construed as limiting since many variations may be made therein without departing from the spirit or scope of the invention. Unless otherwise specified, all parts and percentages are by weight.

*Example 1*

Fifty parts (0.5 mole) of tetrahydrofurfural were added incrementally over a period of about 30 minutes to a mixture of 37.6 parts (0.5 mole) of a 40% formaldehyde solution and enough 1 N sodium hydroxide to bring the pH to a value of about 9–11. During this period the temperature was maintained at 24–30° C., after which the temperature was permitted to increase to 48–50° C. over the next 20–30 minutes. The reaction mixture was neutralized with hydrochloric acid and added to a hydrogenation apparatus together with 10 parts of Raney nickel catalyst (the so-called W7 which is a nickel-ethanol suspension). Hydrogenation was carried out at about 100° C. and at superatmospheric pressure until the pressure drop indicated the consumption of 0.5 mole of hydrogen. The catalyst was removed by filtration. The reaction mixture was then distilled and the fraction boiling in the range 90–100° C./0.3–0.6 mm. of Hg was collected. This fraction was a colorless liquid which crystallized on standing at room temperature. It had a hydroxyl content of 24.6% compared to a value of 25.76% for pure 2,2-bis(hydroxymethyl)tetrahydrofuran. A purified sample for elemental analysis (B.P. 95° C./0.5 mm. Hg; M.P. about 55° C.) showed 54.14% carbon and 9.17% hydrogen compared to theoretical values of 54.52% carbon and 9.16% hydrogen. The bis-p-nitrobenzoic ester was prepared as an identifying derivative. It melted at 179.5°–180° C. and gave an analysis of 56.02% carbon, 4.75% hydrogen and 6.68% nitrogen compared to the theoretical values of 55.81% carbon, 4.21% hydrogen and 6.51% nitrogen.

*Example 2*

Crude tetrahydrofurfural was prepared by oxidation of tetrahydrofurfuryl alcohol by the procedure described in British Patent 593,617. The crude product was analyzed by vapor phase chromatography and found to contain 92.5% tetrahydrofurfural, the remainder comprising tetrahydrofurfuryl alcohol and other unidentified materials. One hundred and eight parts of this crude product (1 mole of tetrahydrofurfural) was added incrementally over 45 minutes to a mixture comprising 47.5 parts (1.15 moles) of sodium hydroxide in 155 parts of water and 202 parts (2.5 moles) of a 37% formaldehyde solution. The temperature during the addition was maintained at 20°–25° C., following which the mixture was heated to 55°–60° C. and kept at that temperature for 3 hours. After acidification with formic acid, the mixture was concentrated by distillation until sodium formate began to precipitate. About 200 parts of n-butanol was added and distillation continued until a copious precipitate had formed. The precipitate was then removed by filtration and distillation continued to remove butanol and water. Final distillation gave a product fraction boiling at 93°–104° C./0.35–0.75 mm. Hg. The yield of 2,2-bis(hydroxymethyl)tetrahydrofuran was 75 parts equivalent to about 57% of the theoretical. An additional 17.2 parts of product was recovered from the precipitate, giving a total yield of about 70% of the theoretical.

*Example 3*

Eighty-two parts (0.755 mole) of the same crude tetrahydrofurfural as was employed in Example 2 was added to alkaline formaldehyde solution (same quantities as Example 2) over a period of 90 minutes while keeping the temperature at about 25° C. during the addition and for 60 minutes thereafter. Following this period, the mixture was heated at 58° C. for 3 hours and then was neutralized with formic acid at 35° C. The resulting reaction mixture was concentrated by vacuum distillation causing the precipitation of sodium formate. The precipitate was filtered off and washed with isobutanol. The combined filtrate and isobutanol used in washing were then further distilled to obtain further concentration. The filtration and washing steps were repeated until no further precipitation occurred and, finally, the isobutanol and water were completely removed by distillation and a product fraction collected having a boiling point in the range 90°–97° C./0.32–0.55 mm. Hg. The yield of 2,2-bis(hydroxymethyl)tetrahydrofuran was 87 parts or 87% of the theoretical.

Equal parts by weight of water and of 2,2-bis(hydroxymethyl)tetrahydrofuran were mixed to test the product of the invention as an antifreeze agent (e.g. antifreeze for pharmaceuticals). The freezing point of the mixture was a satisfactory −17.0° C.

The compound of the invention has a number of uses in addition to that of being an antifreeze agent. It is useful as a humectant. Its esters are useful plasticizers, and products with surfactant properties are obtainable from the compound by reaction with ethylene and propylene oxides, and by partial esterification with a long chain fatty acid followed by sulfation of the remaining hydroxyl group. The diacetate ester is useful as a solvent for dyes such as are employed in lipstick preparations. The dioleate ester is useful in vinyl polymer stabilization.

As a 1,3-propyleneglycol, the product of the invention is a source of a variety of valuable derivatives. By conventional means known to those skilled in the art it enters into the usual alcohol and glycol reactions. Thus, halo derivatives, esters, half esters, ethers, ether alcohols and ether esters are readily prepared. Reaction of the compound with dibasic carboxylic acids and anhydrides gives rise to alkyd-type resins. Additionally, the etheric nucleus of the compound can be cleaved by the action of mineral acids, acid halides and anhydrides to obtain the corresponding derivatives of 2-hydroxymethyl-1,2,5-pentanetriol.

I claim:

1. A process for the preparation of 2,2-bis(hydroxymethyl)tetrahydrofuran which comprises reacting an aqueous solution of formaldehyde and tetrahydrofurfural in the presence of an alkaline condensing agent and then recovering the desired product from the reaction mixture.

2. A process for the preparation of 2,2-bis(hydroxymethyl)tetrahydrofuran which comprises reacting an aqueous solution of formaldehyde and tetrahydrofurfural in the presence of an alkaline condensing agent, the molar ratio of formaldehyde to tetrahydrofurfural being at least about 2:1, and then recovering the desired product from the reaction mixture.

3. A process for the preparation of 2,2-bis(hydroxymethyl)tetrahydrofuran which comprises adding tetrahydrofurfural to a mixture comprising an aqueous formaldehyde solution containing about 5% to about 40% by weight of formaldehyde and an alkaline condensing agent while maintaining said mixture at a temperature ranging between about 10° C. and about 60° C., the molar ratio of formaldehyde to tetrahydrofurfural being at least about 2:1 and the amount of said condensing agent being sufficient to provide at least about one equivalent weight of alkaline agent per mole of tetrahydrofurfural, neutralizing the resulting mixture, concentrating the neutralized mixture, diluting the concentrate thus obtained with a saturated lower-aliphatic alcohol, separating the resulting solid phase from the liquid phase, and recovering the desired product from said liquid phase by fractional distillation.

References Cited in the file of this patent

UNITED STATES PATENTS 2,851,499      Garber et al. _____ Sept. 9, 1958